(12) United States Patent
Nemoto

(10) Patent No.: US 9,791,802 B2
(45) Date of Patent: Oct. 17, 2017

(54) SCANNING OPTICAL DEVICE AND IMAGE FORMING APPARATUS

(71) Applicant: CANON KABUSHIKI KAISHA, Tokyo (JP)

(72) Inventor: Kenji Nemoto, Kawasaki (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 0 days.

(21) Appl. No.: 15/411,856

(22) Filed: Jan. 20, 2017

(65) Prior Publication Data

US 2017/0131656 A1    May 11, 2017

Related U.S. Application Data

(63) Continuation of application No. 15/014,908, filed on Feb. 3, 2016, now Pat. No. 9,588,456.

(30) Foreign Application Priority Data

Feb. 17, 2015 (JP) ................................. 2015-029098

(51) Int. Cl.
*G03G 15/04* (2006.01)
*G03G 15/043* (2006.01)
*G02B 26/12* (2006.01)

(52) U.S. Cl.
CPC .......... *G03G 15/043* (2013.01); *G02B 26/127* (2013.01)

(58) Field of Classification Search
CPC .. G03G 15/04; G03G 15/043; G03G 2215/04; G02B 26/127
USPC ....... 399/4, 51, 177; 347/132, 133, 236, 246
See application file for complete search history.

(56) References Cited

U.S. PATENT DOCUMENTS

| | | | |
|---|---|---|---|
| 6,710,330 B1 | 3/2004 | Tagami et al. | 250/234 |
| 7,274,499 B2 | 9/2007 | Kato | 359/216 |
| 9,357,097 B1 | 5/2016 | Tanaka et al. | |
| 2002/0113962 A1 | 8/2002 | Kojima et al. | 356/307 |
| 2010/0118369 A1 | 5/2010 | Takayama et al. | 359/213.1 |

FOREIGN PATENT DOCUMENTS

| | | |
|---|---|---|
| JP | H11-187219 | 7/1999 |
| JP | 2000-349305 | 12/2000 |
| JP | 2005-088352 | 4/2005 |
| JP | 2015-011099 | 1/2015 |

*Primary Examiner* — Sophia S Chen
(74) *Attorney, Agent, or Firm* — Fitzpatrick, Cella, Harper & Scinto

(57) ABSTRACT

At image formation time, when the light amount setting value used in the image formation is equal to or larger than the light amount value Xm affected by the stray light, a corrected signal width Tw corresponding to the light amount setting value used in the image formation is calculated from the increase ratio αn of the signal width tn of a detection signal acquired in a region having a light amount value smaller than the light amount value Xm affected by the stray light; and a synchronization signal is generated on the basis of a center position of the corrected signal width Tw.

18 Claims, 12 Drawing Sheets

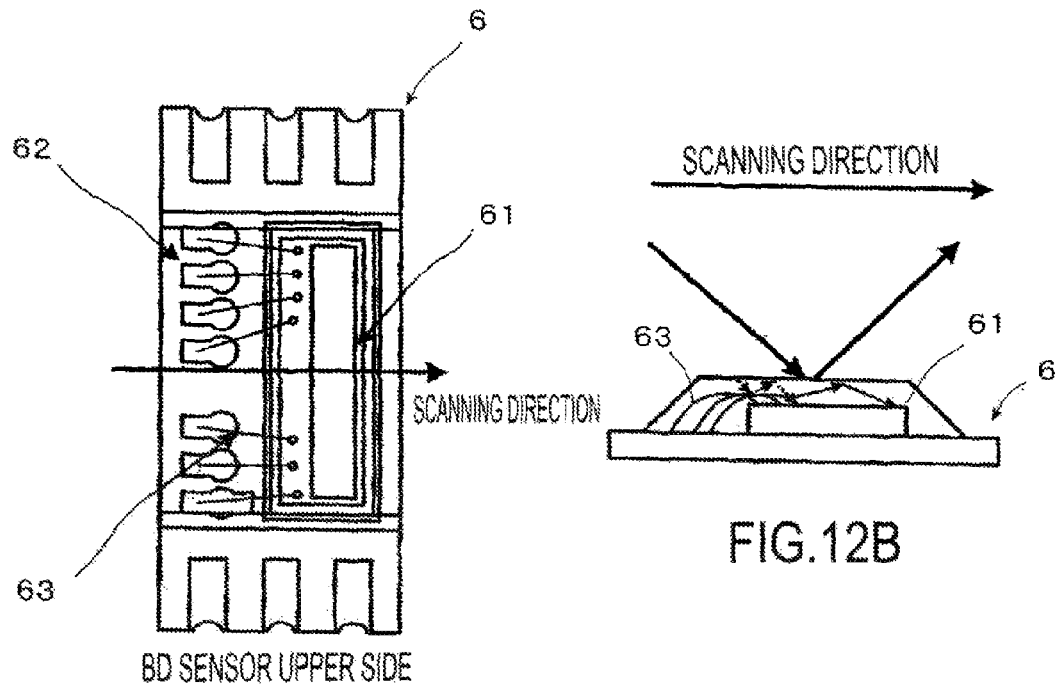
FIG.12A
FIG.12B
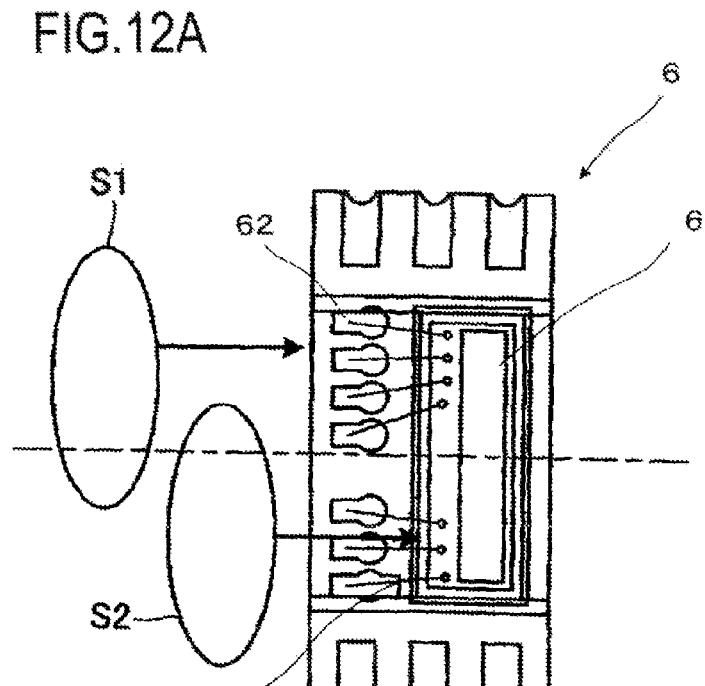
FIG.12C

SCANNING OPTICAL DEVICE AND IMAGE FORMING APPARATUS

This application is a continuation of application Ser. No. 15/014,908 filed Feb. 3, 2016, currently pending; and claims priority under 35 U.S.C. §119 to Japan Application 2015-029098 filed in Japan on Feb. 17, 2015; and the contents of all of which are incorporated herein by reference as if set forth in full.

BACKGROUND OF THE INVENTION

Field of the Invention

The present invention relates to a scanning optical device of an image forming apparatus that forms an image by scanning an image bearing member with a laser light beam and, more particularly to a scanning optical device and an image forming apparatus including a photodetector that detects a laser light beam on an upstream side of an image bearing member and generates a synchronization signal.

Description of the Related Art

As the scanning optical device used in the image forming apparatus of this type, there has been known, for example, a scanning optical device described in Japanese Patent Application Laid-Open No. H11-187219.

The scanning optical device includes a rotary polygon mirror that repeatedly deflects a laser light beam from a semiconductor laser at a fixed angle and scans and exposes a photosensitive member surface, which is an image bearing member, in a direction parallel to the rotation axis of a photosensitive member and a scanner motor that drives to rotate the rotary polygon mirror.

A photodetector that detects the laser light beam is provided in a region further on an upstream side than an image writing start position on the photosensitive member. A synchronization signal for synchronizing image writing start timing is generated from an output waveform of the photodetector.

In the generation of the synchronization signal, the output waveform of the photodetector is changed to a square wave at a predetermined threshold, a center position of a signal width is detected from timings of both of rising and falling of the square wave, and the synchronization signal is output at timing of a half position from the position of the falling. By setting the center of the signal width as a reference in this way, even if the signal width is different depending on a light amount of the laser light beam, it is possible to output the synchronization signal at the same timing.

SUMMARY OF THE INVENTION

However, in order to realize a reduction in the costs of the photodetector, it is necessary to set a chip size of the photodetector as small as possible. On the other hand, in a configuration in which the laser light beam deflected by the rotary polygon mirror is made incident directly on the photodetector without passing through an optical component, a spot diameter of the laser light beam is large. Therefore, the laser light beam is sometimes reflected on wire bonding, a terminal, or the like around a light receiving section, changed to stray light, and made incident on the light receiving section. In this case, it is likely that an output waveform of the photodetector is distorted and the center of the signal width shifts to worsen jitters. Consequently, it is likely that an image failure occurs.

It is an object of the present invention to provide a scanning optical device and an image forming apparatus that can stably gene rate a synchronization signal and obtain a stable image without worsening jitters even in a configuration in which stray light due to reflection of a laser light beam affects an output of a photodetector.

An object of the present invention is to provide a scanning optical device comprising:

a laser light source that emits a laser light beam;

a laser control section that controls a light amount of the laser light beam emitted from the laser light source;

a rotary polygon mirror having a plurality of surfaces that reflect the laser light beam and scan an image bearing member surface;

a photodetector that converts the laser light beam reflected by the rotary polygon mirror into an electric signal;

a signal-width detecting section that detects a signal width using an output waveform of the photodetector as a detection signal on the basis of a threshold set in advance; and a control section that cause the laser light source emit laser light beams at light amounts in a plurality of stages controlled by the laser control section, causes the signal-width detecting section to detect the signal width from output wave forms of the photodetector of the respective laser light beams, acquires, from information concerning the light amounts and the detected signal width, an increase ratio of the signal width increasing according to an increase in the light amounts, and determines, as the light amount affected by stray light, the light amount at which the increase ratio of the signal width of at least one reflection surface of the rotary polygon mirror is equal to or larger than an increase ratio set in advance, wherein when the light amount used in image formation is equal to or larger than the light amount affected by the stray light, the control section acquires a corrected signal width corresponding to the light amount used in the image formation from the increase ratio of the signal width of the detection signal acquired in a region having a light amount smaller than the light amount affected by the stray light.

Another object of the present invention is to provide a scanning optical device comprising:

a laser light source that emits a laser light beam;

a laser control section that controls a light amount of the laser light beam emitted from the laser light source;

a rotary polygon mirror having a plurality of surfaces that reflect the laser light beam and scan an image bearing member surface;

a photodetector that converts the laser light beam reflected by the rotary polygon mirror into an electric signal;

a signal-width detecting section that detects a signal width using an output waveform of the photodetector as a detection signal on the basis of a first threshold set in advance; and a control section that cause the laser light source emit laser light beams at light amounts in a plurality of stages controlled by the laser control section, causes the signal-width detecting section to detect the signal width from output wave forms of the photodetector of the respective laser light beams, acquires, from information concerning the light amounts and the detected signal width, an increase ratio of the signal width increasing according to an increase in the light amounts, and determines, as the light amount affected by stray light, the light amount at which the increase ratio of the signal width of at least one reflection surface of the rotary polygon mirror is equal to or larger than an increase ratio set in advance, wherein when the light amount used in image formation is equal to or larger than the light amount affected by the stray light, the control section causes the signal-width detecting section to detect a detection width of the detection signal on the basis of a second threshold larger than the first threshold.

Another object of the present invention is to provide an image forming apparatus comprising:
a scanning optical device including:
a laser light source that emits a laser light beam;
a laser control section that controls a light amount of the laser light beam emitted from the laser light source;
a rotary polygon mirror having a plurality of surfaces that reflect the laser light beam and scan an image bearing member surface;
a photodetector that converts the laser light beam reflected by the rotary polygon mirror into an electric signal;
a signal-width detecting section that detects a signal width using an output waveform of the photodetector as a detection signal on the basis of a threshold set in advance; and
a control section that cause the laser light source emit laser light beams at light amounts in a plurality of stages controlled by the laser control section, causes the signal-width detecting section to detect the signal width from output waveforms of the photodetector of the respective laser light beams, acquires, from information concerning the light amounts and the detected signal width, an increase ratio of the signal width increasing according to an increase in the light amounts, and determines, as the light amount affected by stray light, the light amount at which the increase ratio of the signal width of at least one reflection surface of the rotary polygon mirror is equal to or larger than an increase ratio set in advance,
the control section acquiring, when the light amount used in image formation is equal to or larger than the light amount affected by the stray light, a corrected signal width corresponding to the light amount used in the image formation from the increase ratio of the signal width of the detection signal acquired in a region having a light amount smaller than the light amount affected by the stray light,
the scanning optical device scanning the charged image bearing member surface with the laser light beam to form a latent image;
a charging section that charges an image bearing member;
a developing section that deposits toner on the image bearing member and develops the latent image as a toner image;
a transfer section that transfers the developed toner image to a transfer material; and
a fixing section that fixes the transferred toner image.

Another object of the present invention is to provide an image forming apparatus comprising:
a scanning optical device including:
a laser light source that emits a laser light beam;
a laser control section that controls a light amount of the laser light beam emitted from the laser light source;
a rotary polygon mirror having a plurality of surfaces that reflect the laser light beam and scan an image bearing member surface;
a photodetector that converts the laser light beam reflected by the rotary polygon mirror into an electric signal;
a signal-width detecting section that detects a signal width using an output waveform of the photodetector as a detection signal on the basis of a first threshold set in advance; and
a control section that cause the laser light source emit laser light beams at light amounts in a plurality of stages controlled by the laser control section, causes the signal-width detecting section to detect the signal width from output waveforms of the photodetector of the respective laser light beams, acquires, from information concerning the light amounts and the detected signal width, an increase ratio of the signal width increasing according to an increase in the light amounts, and determines, as the light amount affected by stray light, the light amount at which the increase ratio of the signal width of at least one reflection surface of the rotary polygon mirror is equal to or larger than an increase ratio set in advance,
the control section causing the signal-width detecting section to detect, when the light amount used in image formation is equal to or larger than the light amount affected by the stray light, a detection width of the detection signal on the basis of a second threshold larger than the first threshold,
the scanning optical device scanning the charged image bearing member surface with the laser light beam to form a latent image;
a charging section that charges an image bearing member;
a developing section that deposits toner on the image bearing member and develops the latent image as a toner image;
a transfer section that transfers the developed toner image to a transfer material; and
a fixing section that fixes the transferred toner image.

Further features of the present invention will become apparent from the following description of exemplary embodiments with reference to the attached drawings.

Further features of the present invention will become apparent from the following description of exemplary embodiments (with reference to the attached drawings).

BRIEF DESCRIPTION OF THE DRAWINGS

FIGS. 12A to 12C are schematic configuration diagrams of the BD sensor.

DESCRIPTION OF THE EMBODIMENTS

First Embodiment

Embodiments are explained in detail with reference to the drawings.

[Image Forming Apparatus]

First, the overall configuration of an image forming apparatus according to a first embodiment is explained with reference to FIG. 1.

Figure 1:
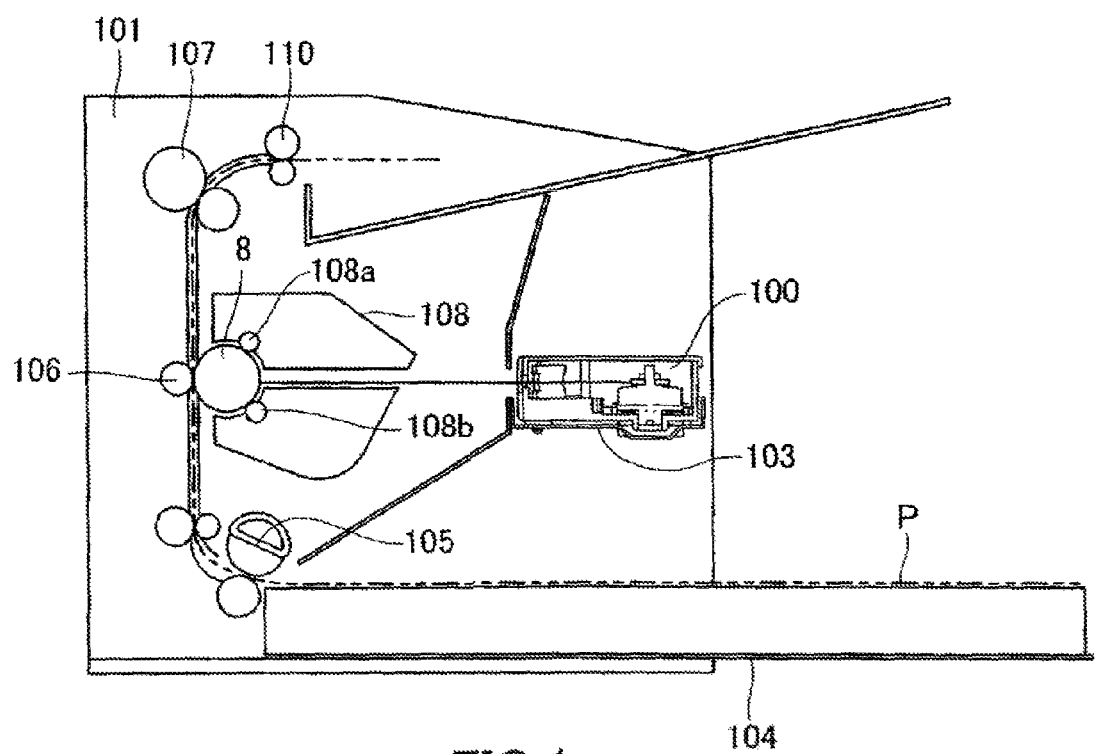
FIG. 1 is a sectional view showing an example of a scanning optical device and an image forming apparatus according to embodiments.

In FIG. 1, reference numeral 101 denotes an image forming apparatus. A scanning optical device 100 explained below is set on an optical table 103, which is a part of a housing of the image forming apparatus 101. In the image forming apparatus 101, a process cartridge 108, which is image forming section, is provided. Besides, a paper feeding section 104, on which a transfer material P is placed, a paper feeding roller 105, a transfer roller (transfer section) 106, and a fixing unit (fixing section) 107 are provided. The process cartridge 108 includes a photosensitive drum (a photosensitive member) 8, which is an image bearing member, a charging roller 108a, and a developing roller 108b. The transfer roller 106 and the photosensitive drum 8 are set in contact with each other to form a transfer nip.

After a surface (an image bearing member surface) of the photosensitive drum 8 is charged by the charging roller 108a while the photo sensitive drum 8 rotates around a rotation axis, a laser light beam is radiated on the photosensitive drum 8 from the scanning optical device 100, whereby a latent image is formed on the surface of the photosensitive drum 8. Thereafter, toner is supplied to the latent image formed on the surface of the photosensitive drum 8 from the developing roller 108b, whereby the latent image is developed as a toner image.

On the other hand, the transfer material P is fed from the paper feeding section 104 by the paper feeding roller 105. The toner image formed on the photosensitive drum 8 is transferred by the transfer roller 106. Thereafter, the toner image on the transfer material P is fixed on the transfer material P with heat and pressure by the fixing unit 107. The transfer material P having the toner image fixed thereon is discharged to the outside of the image forming apparatus 101 by a paper discharge roller 110.

[Scanning Optical Device]

The scanning optical device 100 is explained.

Figure 2:
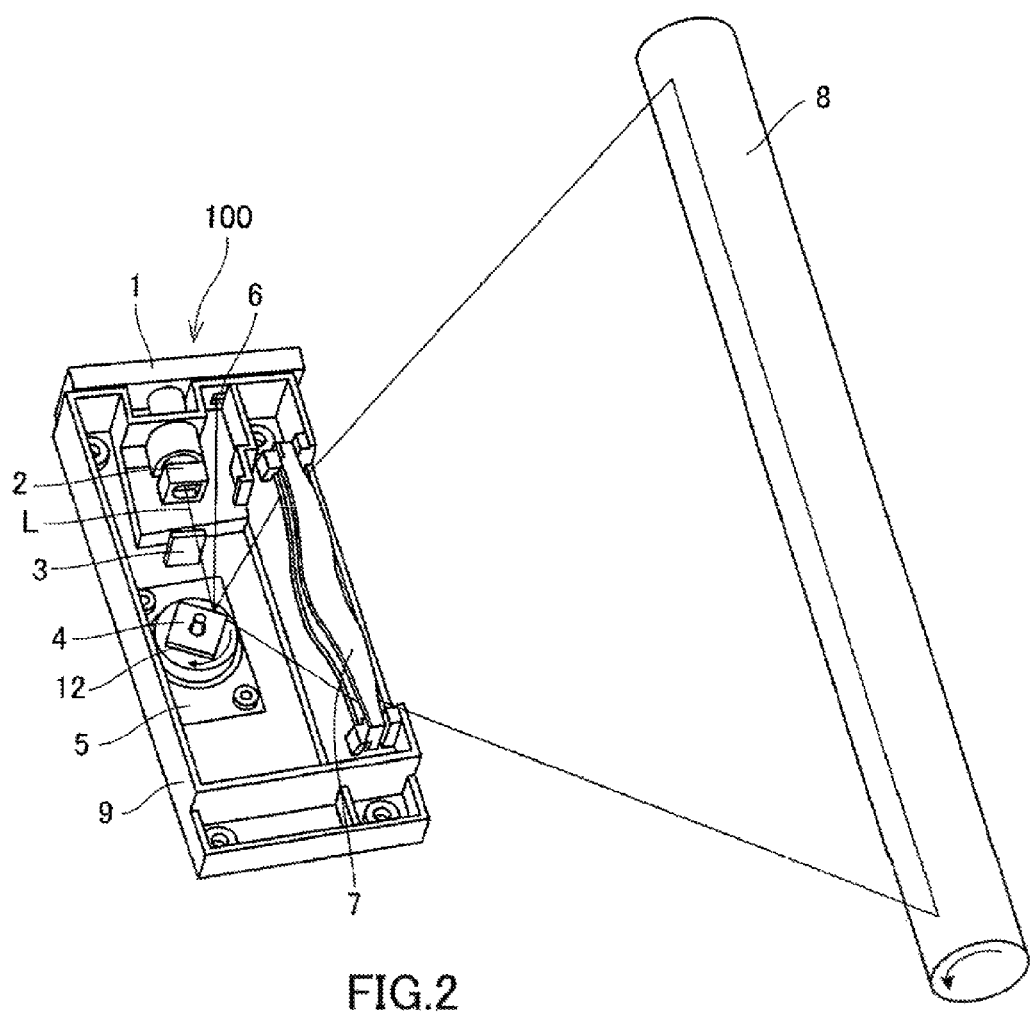
FIG. 2 is a schematic configuration diagram of the scanning optical device shown in FIG. 1.

FIG. 2 is a schematic perspective view of the scanning optical device 100. A semiconductor laser unit 1 is a unit of a not-shown semiconductor laser, which functions as a light source that emits a laser light beam L, and a driving circuit for the semiconductor laser. The laser light beam L emitted from the semiconductor laser passes through a lens 2 having a collimator lens function and a cylindrical lens function and an aperture stop 3 and is made incident on one of a plurality of reflection surfaces 12 formed on (a rotary polygon mirror) 4 of an optical deflector 5.

The rotary polygon mirror 4 is driven to rotate in a direction of an arrow by a scanner motor included in the optical deflector 5 and deflects the laser light beam L. A direction in which the laser light beam L is reflected on the reflection surface 12 changes according to the rotation of the rotary polygon mirror 4. When the rotary polygon mirror 4 is present in a predetermined rotation phase, the laser light beam L reflected on the reflection surface 12 is made incident on the light receiving section of a BD sensor 6, which is a photodetector, without passing through the lens and the like. When the rotary polygon mirror 4 is present in another rotation phase, the laser light beam L is made incident on an fθ lens (a scanning lens) 7 and made incident on a photosensitive surface (a scanned surface), which is a surface of the photosensitive drum 8. The optical members explained above (the semiconductor laser unit 1, the lens 2, the aperture stop 3, the optical deflector 5, the BD sensor 6, and the fθ lens 7) are positioned and fixed in an optical box 9.

[Scanning of the Photosensitive Drum by the Laser Light Beam]

A method in which the scanning optical device 100 scans and exposes the photosensitive drum 8 with the laser light beam is explained. The laser light beam L emitted from the semiconductor laser of the semiconductor laser unit 1 changes to substantially parallel light or convergent light in a main scanning direction and changes to convergent light in a sub-scanning direction by the action of the lens 2. Subsequently, the laser light beam L passes through the aperture stop 3 to be limited in a light beam width and extends long in the main scanning direction and is focused in a focal line shape on the reflection surface 12 of the rotary polygon mirror 4.

A reflecting direction of the laser light beam L on the reflection surface 12 continuously changes according to the rotation of the rotary polygon mirror 4. The laser light beam L is deflected. When the rotary polygon mirror is present in a predetermined rotation phase, the reflected laser light beam L is made incident on a light receiving section 61 (see FIGS. 12A to 12C) of the BD sensor 6, which functions as the photodetector that outputs a BD signal, without being transmitted through the lens and the like and is converted into an electric signal.

According to the rotation of the rotary polygon mirror 4, a spot image of the laser light beam L passes over the light receiving section 61. At this point, the BD sensor 6 outputs a BD signal on the basis of a light reception amount in the light receiving section 61. Timing of a light emission start of a light source (a writing start of an image) based on image data is determined on the basis of timing when the BD signal is output.

When the rotary polygon mirror 4 further rotates a predetermined amount, the reflected laser light beam L is transmitted through the fθ lens 7 and made incident on the surface of the photosensitive drum 8. The fθ lens 7 condenses the laser light beam L and focuses the laser light beam L on the surface of the photosensitive drum 8 as a spot image. While the rotary polygon mirror 4 further rotates the predetermined amount after the laser light beam L starts the incidence on the fθ lens 7, the laser light beam L continues to be transmitted through the fθ lens 7 and made incident on the surface of the photosensitive drum 8. The spot image of the laser light beam L moves in a scanning direction corresponding to the rotating direction of the rotary polygon mirror 4.

The scanning direction is parallel to the rotation axis direction of the photosensitive drum 8. Concerning the fθ lens 7, a focusing position of the laser light beam L is designed such that the spot image of the laser light beam L moves in the scanning direction at equal speed on the surface of the photosensitive drum 8.

While the spot image of the laser light beam L moves in the scanning direction on the surface of the photosensitive drum 8, a driving current is supplied to a light source of the semiconductor laser unit 1 on the basis of a laser driving signal (a VIDEO signal) corresponding to formed image data. Consequently, the light source is lit. The laser light beam L is scanned in the scanning direction (main scanning), whereby a latent image corresponding to the image data is formed.

In addition to the rotation of the scanner motor, the photosensitive drum 8 rotates around the rotation axis of the photosensitive drum 8, whereby the spot image of the laser light beam L moves relatively to the photosensitive drum 8 (sub-scanning) in a direction orthogonal to the scanning direction. In this way, according to the rotation of the rotary polygon mirror 4 and the rotation of the photosensitive drum 8, a two-dimensional latent image corresponding to the image data is formed on the surface of the photosensitive drum 8 by the scanning by the laser light beam L.

An output process of the BD signal and a scanning process by the laser light beam L on the photosensitive drum 8 after the output process explained above are performed for each of the reflection surfaces 12 according to the rotation of the rotary polygon mirror 4.

A control configuration of the scanning optical device 100 is explained.

First, incident light waveforms and signal widths of a BD signal with respect to laser light beam amounts, which are the premise of the present invention, are explained with reference to FIG. 11.

Figure 11:
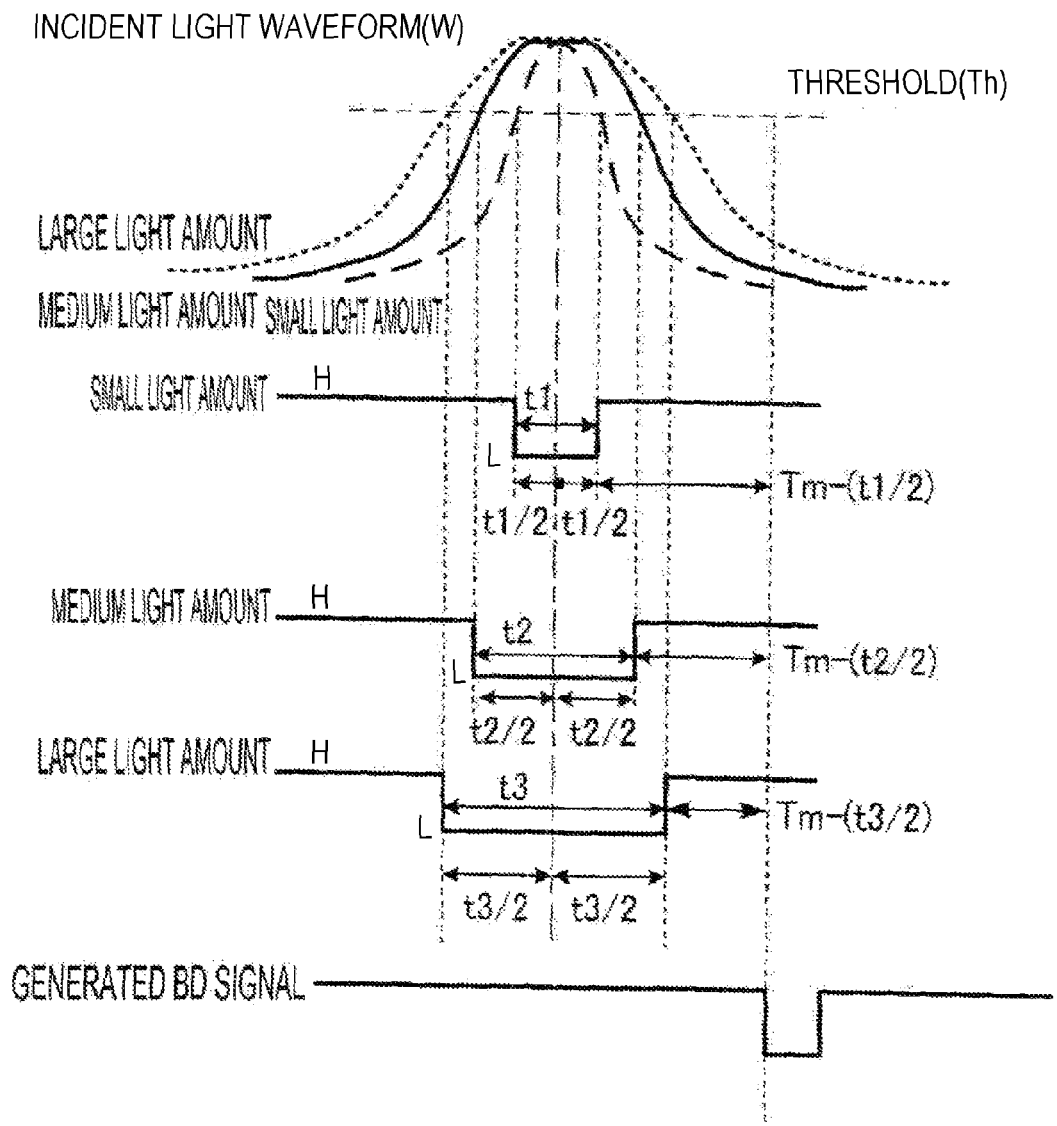
FIG. 11 is a diagram for explaining BD signal widths corresponding to ideal laser light amounts in a BD sensor.

In FIG. 11, ideal incident light waveforms W received by the BD sensor 6 are shown to be superimposed for each of three kinds of light waveforms having a small light amount, a medium light amount, and a large light amount. The ideal incident light waveforms W have symmetrical ridge shapes. The widths of the incident light waveforms W increase in the order of the small light amount, the medium light amount, and the large light amount. The incident light waveforms W are set as square detection signals, values of which larger than a threshold are represented as L and value of which smaller than the threshold are represented as H on the basis of a threshold Th set in advance. Signal widths between falling and rising of the detection signals are set as BD signal widths. Note that the detection signals are an example. The detection signals may be squares signals, values of which larger than the threshold are represented as H and values of which smaller than the threshold are represented as L.

In the case of the incident light waveform having the small light amount, the BD signal width is t1. Timing when the generated BD signal is output can be calculated by subtracting t1/2, which is a center position of an actual BD signal width t1, from a maximum Tm of the BD signal width set in advance. That is, the generated BD signal is output at timing of Tm−(t1/2) from the rising of the BD signal.

Ideal light waveforms received by the BD sensor 6 are symmetrical. When the laser light beam amount is increase to the medium light amount and the large light amount, the BD signal width increases to t2 and t3. However, the center position of the BD signal is fixed. Therefore, even if the laser light beam amount is changed to the medium light amount and the large light amount, the BD signal can be generated at timings of Tm−(t2/2) and Tm−(t3/2) (fixed timings) on the basis of the center position of the BD signal. The BD signal generated at the timings is referred to as generated BD signal. It is possible to perform image formation to be synchronized with a cycle of the generated BD signal.

FIGS. 12A to 12C show the BD sensor 6.

The BD sensor 6 includes the light receiving section having a square shape, terminals 62 for electric connection disposed to be separated from one another on one side of the light receiving section 61, and wire bonding 63 for connecting the light receiving section 61 and the terminals 62. The laser light beam L deflected by the rotary polygon mirror 4 is made incident directly on the BD sensor 6 without passing through an optical component. Since the spot diameter of the laser light beam L increases, the light receiving section 61 occupies most of the area in the BD sensor 6.

In order to minimize the size of the BD sensor 6, the disposition of the light receiving section 61, the wire bonding 63, and the terminals 62 in the BD sensor 6 is limited. The terminals 62, the wire bonding 63, and the light receiving section 61 are disposed in this order on a straight line from an upstream side to a downstream side in a beam scanning direction of the laser light beam L. If a wire bonding 63 and the terminals 62 are present in a beam scanning region, the laser light beam L reflected on the wire bonding 63 and the terminals 62 changes to stray light and affects an output of the BD sensor 6.

Figure 7:
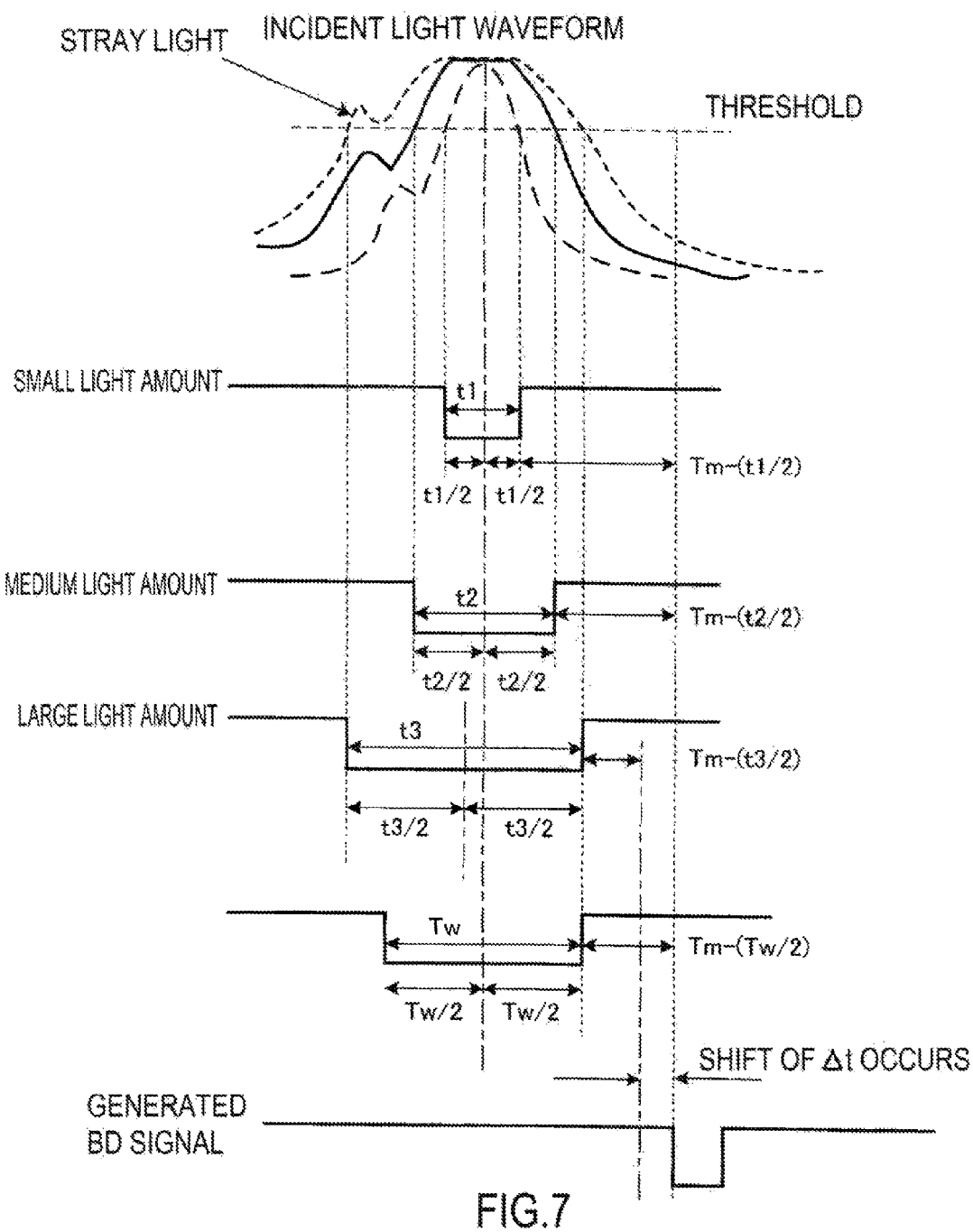
FIG. 7 is a diagram for explaining a laser light amount and a BD signal in a second embodiment.

In FIG. 7, a relation between incident light waveforms including stray light and BD signal widths is shown.

As shown in FIG. 7, when the light amount of the laser light beam L is large, the incident light waveform in the stray light is equal to or larger than the threshold Th. The incident light waveform is not symmetrical because of the influence of the stray light. The center position of the BD signal shifts compared with the small light amount and the medium light amount. A direction in which the center position shifts is the falling side. Therefore, the generated BD signal generated at the BD signal width t3 in the large light amount shifts by Δt compared with the generated BD signals at the small light amount and the medium light amount.

Further, the incident light waveform is also affected in a position where the spot diameter of the laser light beam L scans the BD sensor 6. FIG. 12C shows a state in which spot diameters S1 and S2 of the laser light beam L scan the BD sensor 6. The position where the spot diameter of the laser light beam scans the BD sensor 6 is affected by an optical facet angle error of the rotary polygon mirror 4. In the rotary polygon mirror 4 having a plurality of surfaces, on the surfaces, like the spot diameters S1 and S2, the spot diameter of the laser light beam L does not scan a fixed position on the BD sensor 6. Therefore, fluctuation occurs in the influence of the stray light as well. Under a condition in which the influence of the stray light is different on each of the surface of the rotary polygon mirror 4, the center position of the BD signal greatly changes on the surfaces of the rotary polygon mirror 4. Therefore, it is likely that jitters of the BD signal increase and an image failure occurs.

In this embodiment, the disposition of the BD sensor 6 is not changed and the influence of the stray light is removed by processing of an output signal.

Figure 3:
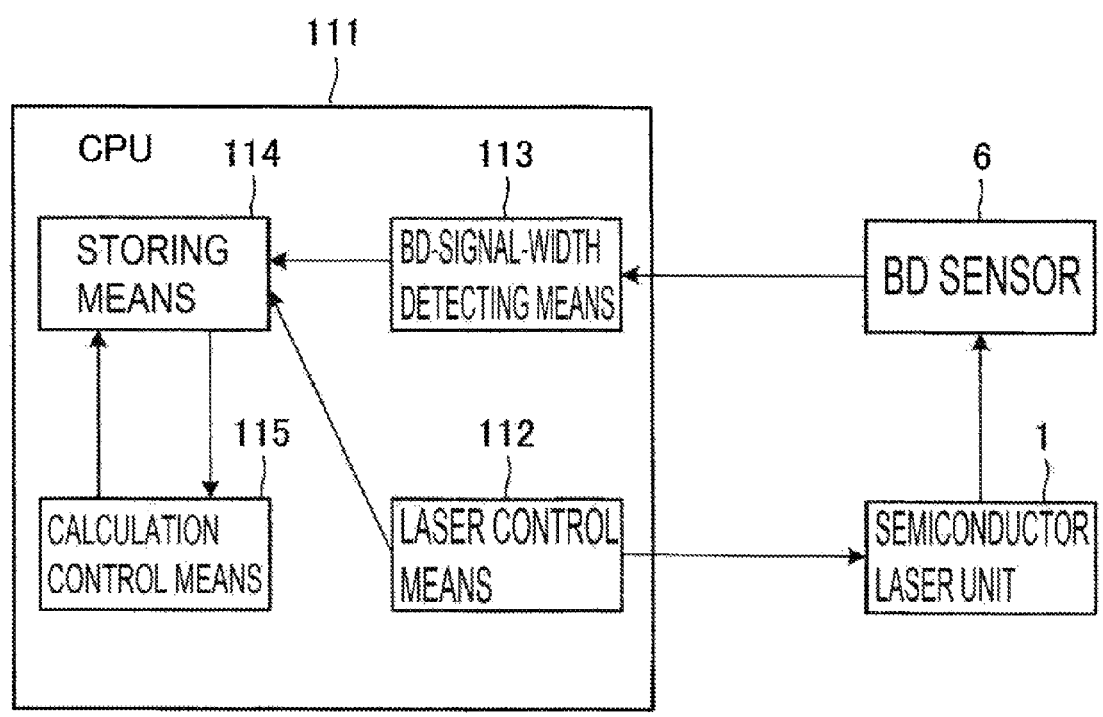
FIG. 3 is a control block diagram of the scanning optical device shown in FIG. 1.

FIG. 3 shows, as a block diagram, a control configuration of the scanning optical device 100 in this embodiment. The scanning optical device 100 includes laser control section 112 for lighting the semiconductor laser unit 1, which is a laser light source, BD-signal-width detecting section 113 for detecting the width of a BD signal, which is an output of the BD sensor 6, storing section 114 in which BD signal widths and laser light beam amount setting values are stored, and calculation control section 115 functioning as a calculating section that calculates or acquires an increase ratio of the BD signal width from the laser light beam amount setting values.

Reference numeral 111 denotes a one-chip microcomputer (hereinafter referred to as CPU 111) functioning as control section. The CPU 111 realizes functions of the laser control section 112, the BD-signal-width detecting section 113, the storing section 114, and the calculation control section 115.

Figure 4:
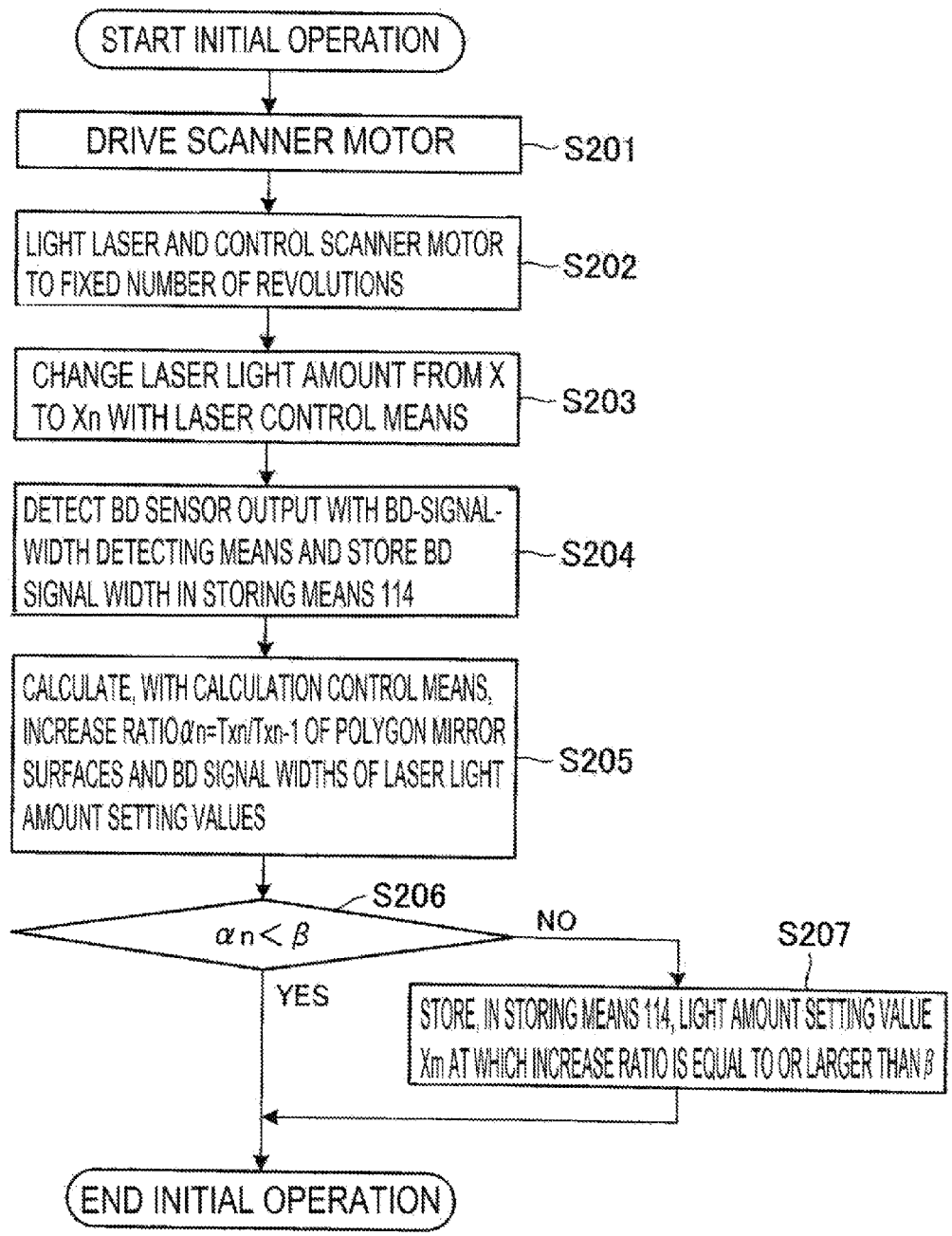
FIG. 4 is a control flowchart during an initial operation in the first embodiment.
Figure 5:
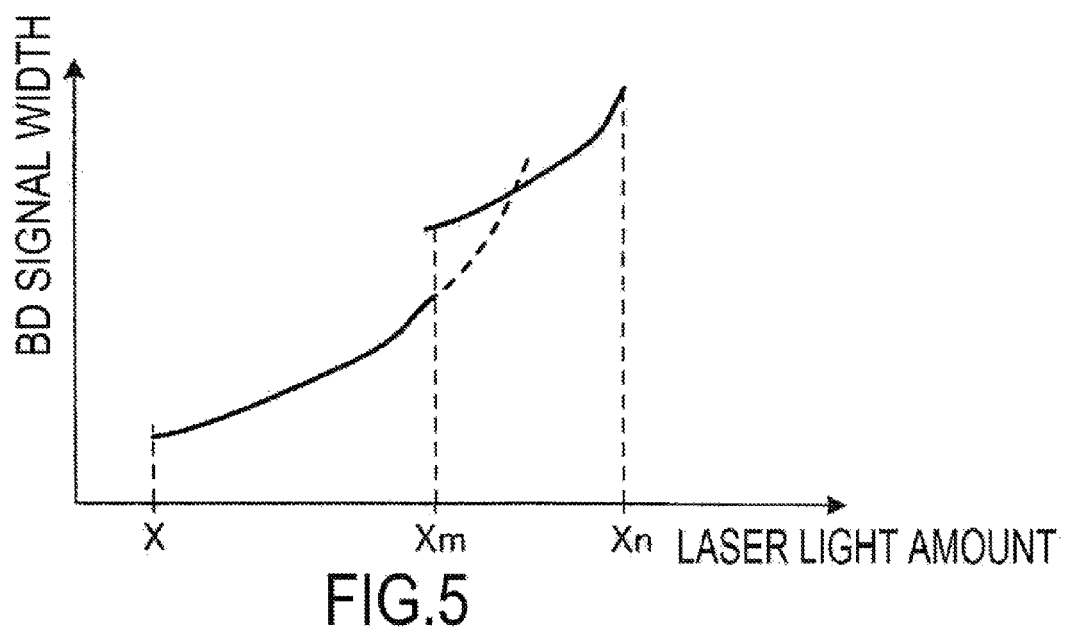
FIG. 5 is a diagram showing a relation between a laser beam light amount and a BD signal in the first embodiment.

A flow of control of the scanning optical device 100 and the image forming apparatus 101 in this embodiment is explained with reference to FIG. 4. In the explanation, a relation between a BD signal width and a laser light beam amount shown in FIG. 5 is referred to as appropriate.

First, in this embodiment, at time other than image formation time, the scanner motor is driven during initial rotation of the image forming apparatus 101 (S201), a laser is lit, and the scanner motor is raised to a target number of revolutions and controlled to a fixed number of revolutions (S202).

The scanner motor is controlled to be kept at the fixed number of revolutions on the basis of a cycle of a rising edge of a BD signal converted from an incident light waveform W detected by the BD sensor 6. In a state in which the scanner motor is kept at the fixed number of revolutions, a light amount of a laser light beam is changed stepwise from X to Xn by the laser control section 112 (S203).

A counter is started and light amount setting values and BD signal widths corresponding to the surfaces of the rotary polygon mirror 4 are measured from a falling edge of the BD signal to the rising edge of the BD signal by the BD-signal-width detecting section 113. The measured BD signal widths are stored in the storing section 114 (S204). In S204, for example, in the case of a light amount setting value X of the laser light beam, the BD signal widths of the polygon surfaces of the rotary polygon mirror 4 are stored in the storing section 114 as TX_a, TX_b, TX_c, and TX_d. When the light amount setting value changes to a light amount setting value Xn, the BD signal widths change to TXn_a, TXn_b, TXn_c, and TXn_d.

An increase ratio of the BD signal widths at the time when the laser light amount setting values are increased is calculated or acquired by the calculation control section 115 from the BD signal widths corresponding to the laser light amount setting values stored in the storing section 114 (S205). As a method of calculating the increase ratio in S205, BD signal widths at a laser amount setting value Xn−1 and the laser light amount setting value Xn are respectively represented as Txn and Txn−1 and a BD signal width increase ratio $\alpha n(=Txn/Txn-1)$ is calculated or acquired for each of the reflection surfaces of the rotary polygon mirror 4.

According to an increase in the laser light amount setting values, as shown in FIG. 5, the BD signal widths increase.

When being affected by the stray light, the BD signal widths suddenly increase. Therefore, if the increase ratio $\alpha n$ of the BD signal width of at least one reflection surface of the rotary polygon mirror 4 is larger than a threshold (larger than $\beta$), it is determine that a laser light amount region is affected by the stray light (S206).

The laser light amount region affected by the stray light is determined. The storing section is caused to store a light amount at that point as a light amount value Xm affected by the stray light (S207).

In summary, laser light beams L are emitted by the laser control section 112 at light amount setting values in a plurality of stages (S201 to S203). A BD signal width tn is detected from output waveforms (incident light waveforms) of the BD sensor 6 of the laser light beams L by the BD-signal-width detecting section 113. The detected BD signal width tn is stored in the storing section 114 (S204).

Subsequently, the increase ratio $\alpha n$ of the signal width increasing according to the increase in the light amount setting value is acquired by the calculation control section 115 from information concerning the light amount setting value Xn and the signal width tn stored in the storing section 114. The light amount setting value at the time when the increase ratio $\alpha n$ of at least one reflection surface of the rotary polygon mirror 4 increases to a value larger than the threshold $\beta$ of the increase ratio set in advance is stored in the storing section 114 as the light amount value Xm affected by the stray light (S205 to S207). When the increase ratio $\alpha n$ is equal to or smaller than the threshold $\beta$, the control flow is ended.

As explained above, at the time other than the image formation time, for example, the initial setting procedure of S201 to S207 is executed in the initial operation or the like, a profile of the BD signal width corresponding to the laser beam amount is acquired, and the influence of the stray light is detected.

Figure 6:
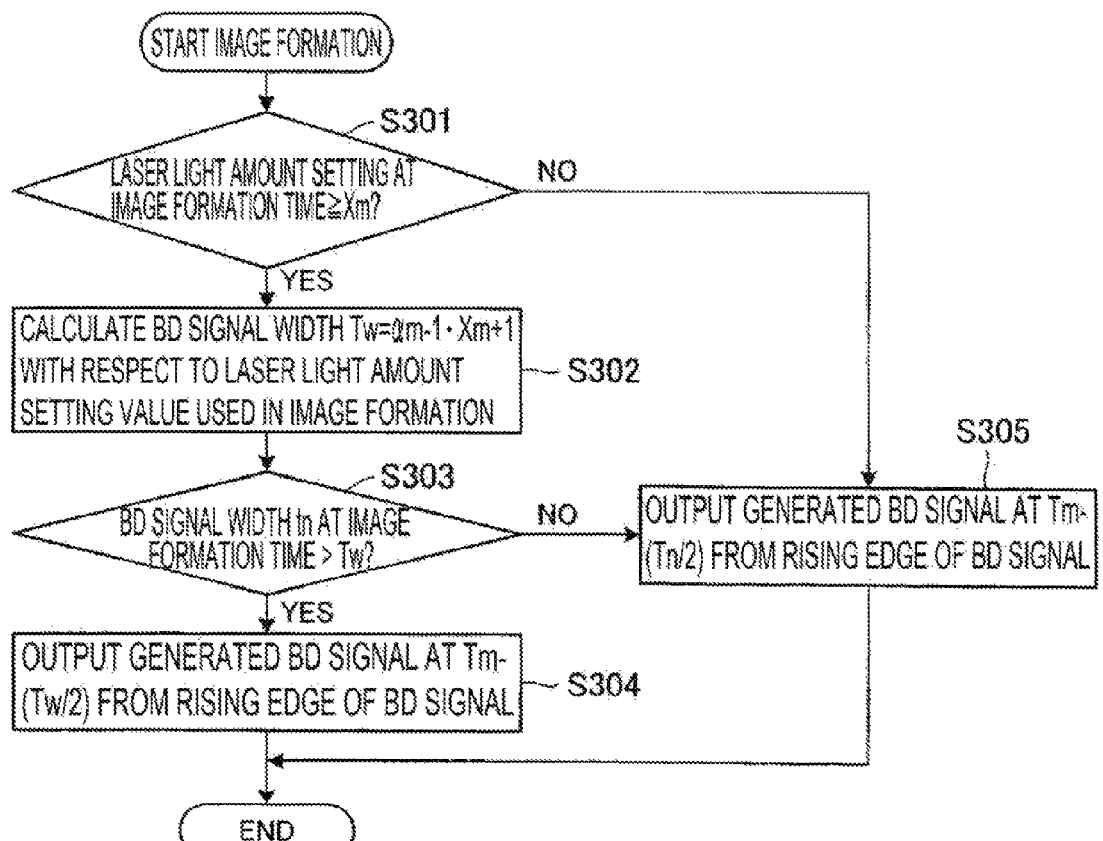
FIG. 6 is a flowchart for explaining a flow of image formation in the first embodiment.

A control flow at image formation time is explained with reference to FIG. 6. A relation between an incident light waveform and a BD signal at the time of stray light is shown in FIG. 7.

It is determined whether a laser light amount setting value used at the image formation time is equal to or larger than the light amount value Xm affected by the stray light (S301). When the laser light amount setting value is Xm+1 equal to or larger than the light amount value (equal to or larger than Xm) affected by the stray light, a BD signal width $Tw=\alpha m-1 \cdot Xm+1$ of a laser light beam amount used in the image formation is calculated by the calculation control section 115 from the BD signal width acquired in the laser light amount region not affected by the stray light and set as a corrected signal width (S302).

The BD signal width tn detected at the image formation time and the BD corrected signal width Tw calculated or acquired by the calculation control section 115 are compared (S303). When the BD signal width tn is larger than the BD corrected signal width Tw, the generated BD signal, which is a synchronization signal, is created using the BD corrected signal width Tw (S304).

In this embodiment, as shown in FIGS. 12A to 12C, the wire bonding 63 and the terminals 62 are formed on the upstream side of the light receiving section 61 of the BD sensor 6 in the laser scanning direction. As shown in FIG. 7, the influence of the stray light occurs on the falling side of the BD signal. When the generated BD signal is created in that state, a writing start position is present on a fast side. Therefore, when the BD signal width detected at the image formation time is larger than the BD corrected signal width Tw calculated or acquired by the calculation control section 115, the generated BD signal is output using an expression Tm−(Tw/2) from the rising edge of the BD signal and laser control of the image formation is performed (S304).

In S301, when the laser light beam amount setting value at the image formation time is smaller than the light amount value Xm affected by the stray light, as in the past, the center position of the BD signal is calculated or acquired from the rising and the falling of the BD signal to output the generated BD signal and the image formation is performed at the generated BD signal cycle (S305).

When the BD signal width to is equal to or smaller than the signal width Tw affected by the stray light in S303, as in the past, the center position of the BD signal is calculated or acquired from the rising and the falling of the BD signal to output the generated BD signal and the image formation is performed at the generated BD signal cycle (S305).

In summary, at the image formation time, when a light amount setting value used in the image formation is equal to or larger than the light amount value (equal to or larger than Xm) affected by the stray light (S301), the corrected signal width $Tw=(\alpha m-1) \cdot (Xm+1)$ corresponding to the light amount setting value used in the image formation is calculated or acquired from the increase ratio $\alpha n$ of the signal width tn of the BD signal, which is a detection signal acquired in a region having a light amount value smaller than the light amount value Xm affected by the stray light (S302).

The signal width tn detected by the BD-signal-width detecting section 113 and the BD corrected signal width Tw are compared. When the detected BD signal width tn is larger than the corrected signal width (larger than Tw), a synchronization signal is generated on the basis of the center position of the BD corrected signal width Tw (S304).

When the signal width tn of the BD signal serving as the detection signal is equal to or smaller than the corrected signal width Tw, the synchronization signal is generated on the basis of the center position of the signal width tn of the BD signal (S305).

By performing the control explained above, it is possible to enable stable scanner control using an inexpensive BD sensor 6 without worsening jitters even under a condition in which there is a difference in the influence of the stray light on each of the surfaces of the rotary polygon mirror 4.

In the BD sensor 6, when the wire bonding 63 and the terminals 62 are formed on the downstream side of the light receiving section 61 in the laser scanning direction, the influence of the stray light occurs on the rising side. Therefore, the scanner motor is controlled such that a fixed number of revolutions is kept on the basis of a cycle of the falling edge of the BD signal converted from the incident light waveform detected by the BD sensor 6. The same effect is obtained by creating the generated BD signal using an expression Tm+(Tw/2) with respect to the falling edge of the BD signal.

Second Embodiment

The image forming apparatus 101 according to a second embodiment is explained. In the following explanation, concerning portions same as the portions in the first embodiment, explanation is omitted.

Figure 8:
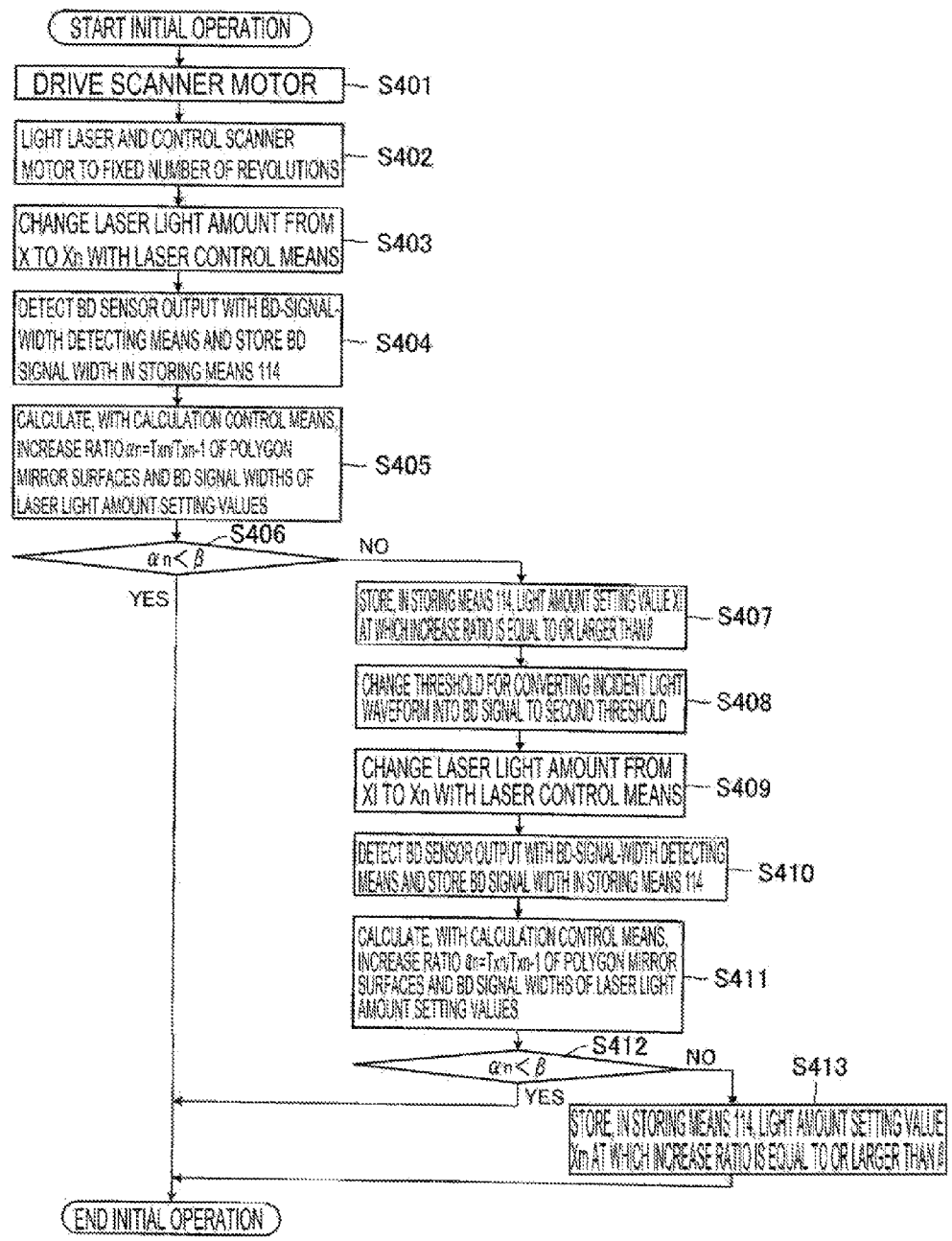
FIG. 8 is a control flowchart for explaining a flow of an initial operation in the second embodiment.

In FIG. 8, a control flow according to this embodiment is shown.

In this embodiment, as in the first embodiment, in S401 to S407, at time other than image formation time, the laser control section 112 changes a laser light amount stepwise from X to Xn to perform scanning with a laser light beam. A signal waveform of the BD sensor 6 is converted into a square wave on the basis of a threshold. Laser light amount setting values and BD signal widths corresponding to the surfaces of the rotary polygon mirror 4 are detected by the BD-signal-width detecting section 113. The BD signal widths at that point are stored in the storing section 114. The increase ratio $\alpha n$ of the BD signal widths at the time when the laser light amount setting values are increased is calculated or acquired by the calculation control section 115 from the BD signal widths corresponding to the laser light amount setting values stored in the storing section 114.

If the increase ratio $\alpha n$ of the BD signal width is equal to or larger than the threshold $\beta$, it is determined that a laser light amount region is affected by stray light. A light amount setting value Xl at which the increase ratio an is equal to or larger than $\beta$ is stored in the storing section 114. A procedure up to here is the same as the procedure in the first embodiment.

When the light amount setting value Xl affected by the stray light is determined, the threshold for the incident light waveform W in the BD sensor 6 is changed to a second threshold Th2 (S408). The light amount setting is changed from Xl to Xn to perform scanning with a laser light beam (S409). A BD signal width is detected again using the second threshold Th2 for the incident light waveform W of the BD sensor 6 and stored in the storing section 114 (S410). The increase ratio $\alpha n$ of the BD signal width is calculated or acquired from a second BD signal width acquired using the second threshold Th2 (S411). At the second threshold Th2, if the increase ratio $\alpha n$ of the BD signal width of at least one reflection surface of the rotary polygon mirror is equal to or larger than the threshold $\beta$, it is determined that laser light amount region is affected by the stray light (S412). The light amount setting value at which the increase ratio $\alpha n$ of the BD signal width is equal to or larger than $\beta$ is stored in the storing section 114 as second light amount setting (S413).

Figure 9:
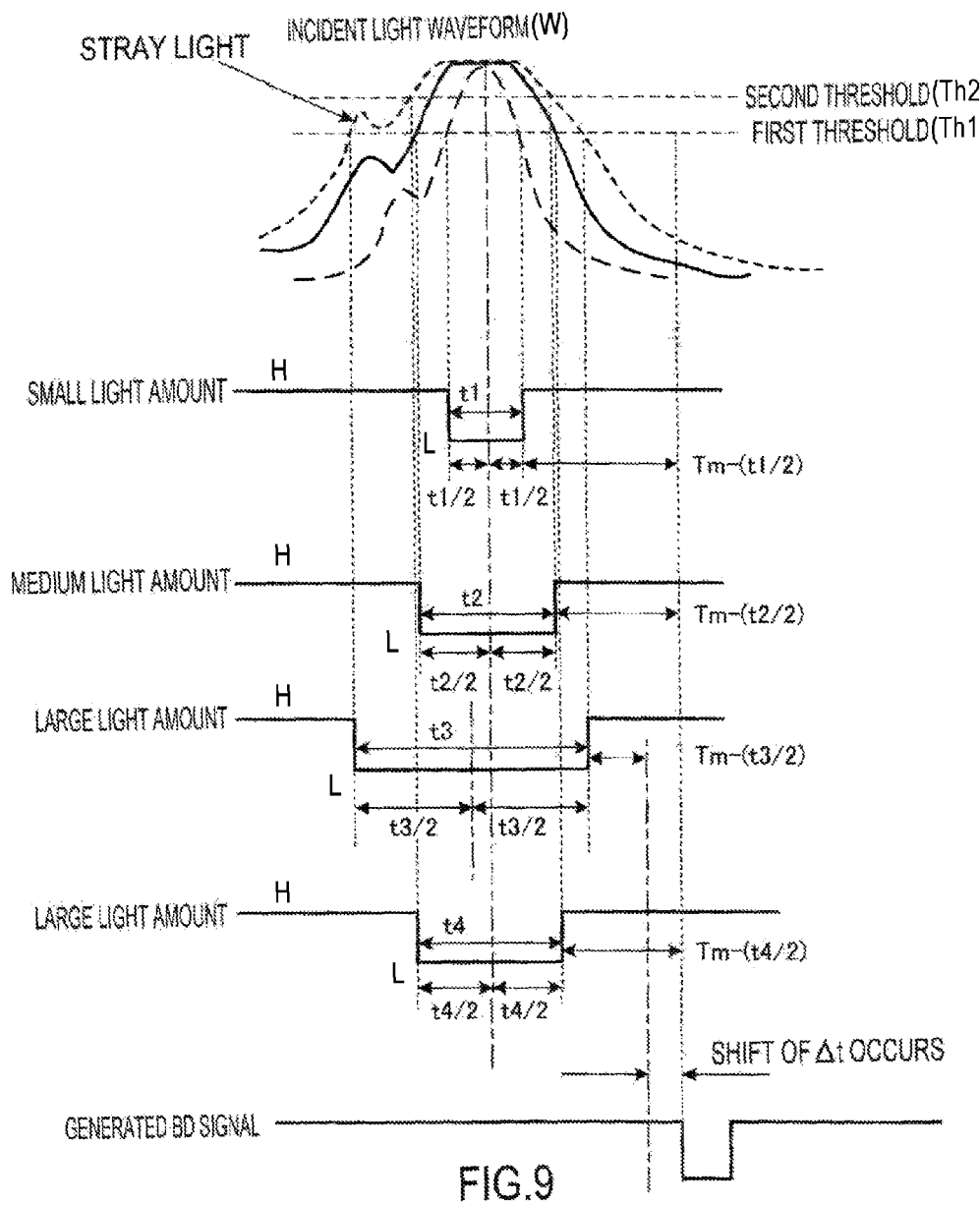
FIG. 9 is a diagram for explaining a laser light amount and a BD signal in the second embodiment.

In FIG. 9, a relation between incident light waveforms and a BD signal at the time of stray light is shown.

As shown in FIG. 9, if a light amount is small or medium, it is possible to generate a generated BD signal without being affected by the stray light at a first threshold Th1. However, in the case of a large light amount, since the generated BD signal is affected by the stray light at the first threshold Th1, a shift occurs in the generated BD signal by $\Delta t$ compared with the generated BD signal in the case of the small light amount and the medium light amount. At the large light amount, by switching the first threshold Th1 to a second threshold Th2, it is possible to generate the generated BD signal without being affected by the stray light.

Figure 10:
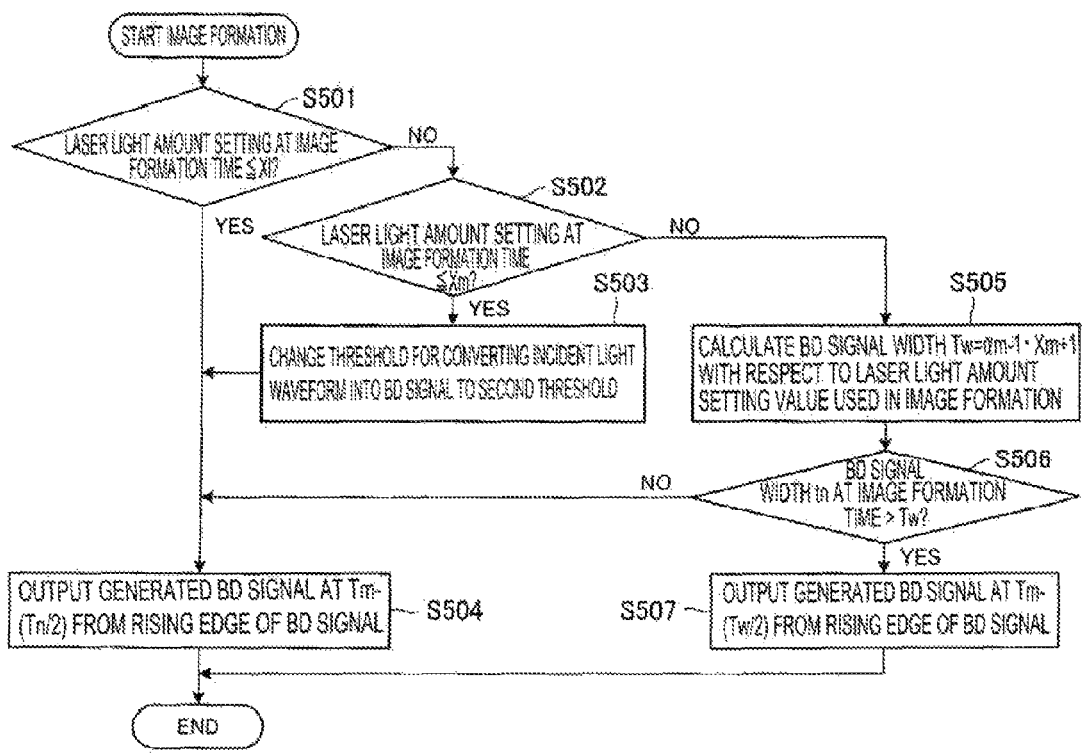
FIG. 10 is a flowchart for explaining a flow of image formation in the second embodiment.

A control flow at image formation time is shown in FIG. 10.

At the image formation time, it is determined whether a light amount setting value in use is larger than the light amount setting value Xl affected by the stray light (S501).

When the light amount setting value is larger than Xl, it is determined whether a second light amount setting value is equal to or larger than the light amount value Xm affected by the stray light (S502).

If the light amount setting value is a setting value (equal to or smaller than Xm) not affected by the stray light at the second threshold Th2, a threshold for changing the incident light waveform in the BD sensor 6 to a BD signal before generation is set as the second threshold Th2 (S503).

By setting the threshold to the second threshold Th2, since the generated BD signal is not affected by the stray light, the generated BD signal is output by calculating a center position of the BD signal from rising and falling of the BD signal as in the past. Image formation is performed at a generated BD signal cycle (S504).

When the generated BD signal is affected by the stray light even at the second threshold Th2, the control flow changes to a control flow of S505 to S507. The same effect can be obtained by performing control same as the control in the first embodiment.

That is, when a laser light amount setting value used at the image formation time is Xm+1 equal to or larger than the light amount value Xm affected by the stray light, the BD signal width Tw=$\alpha m-1 \cdot Xm+1$ of a laser light beam amount used in the image formation is calculated or acquired by the calculation control section 115 from the BD signal width acquired in the laser light amount region not affected by the stray light (S505).

The BD signal width tn detected at the image formation time and the BD signal width Tw calculated or acquired by the calculation control section 115 are compared (S506). When the BD signal width tn is larger than the BD signal width Tw, the generated BD signal is created using the BD signal width Tw (S507).

By performing the control explained above, it is possible to enable stable scanner control using an inexpensive BD sensor 6 without worsening jitters even under the influence of the stray light.

Note that, in the second embodiment, the thresholds for converting the incident light waveform in the BD sensor 6 into the BD signal, which is the detection signal before generation, are explained in the two stages. However, thresholds may be further provided.

In short, at initial setting time (initial operation time) other than the image formation time, laser light beams L are emitted from the laser control section 112 at light amount setting values in a plurality of stages. A signal width is detected from output waveforms of the BD sensor 6 of the laser light beams L by the BD-signal-width detecting section 113. The signal width is stored in the storing section 114. The increase ratio $\alpha n$ of the signal width increasing according to an increase in the light amount setting values is acquired by the calculation control section 115 from information concerning the light amount setting values and the signal width stored in the storing section 114. A light amount setting value at the time when an increase ratio $\alpha 2$ of a signal width of at least one reflection surface of the rotary polygon mirror 4 is equal to or larger than the threshold $\beta$ of the increase ratio set in advance is stored in the storing section 114 as a light amount value affected by the stray light (S401 to S405).

The series of control procedures are sequentially executed on a plurality of kinds of detection signals obtained by dividing an output waveform of the BD sensor 6 by thresholds in a plurality of stages. In that case, except the case of a threshold in a first stage, during control execution on a detection signal of a threshold of one stage, from a light amount value affected by the stray light acquired by a threshold in the preceding stage, light amounts affected by the stray light are sequentially stored concerning light amount setting values in a plurality of stages set in a direction in which the light amounts increase.

At the image formation time, the light amount setting values Xn affected by the tray light in a plurality of stages respectively obtained for the thresholds in the plurality of stages are sequentially compared from a smallest value with the light amount setting value X used in the image formation. As a result of the comparison, a detection signal of a threshold corresponding to a light amount value affected by the stray light larger than the light amount setting value used in the image formation only has to be selected. A synchronization signal only has to be generated on the basis of a center position of a signal width of the detection signal.

When the light amount setting value used in the image formation is equal to or larger than a maximum of light amount values (Xm in the second embodiment) affected by the stray light respectively obtained for thresholds Th1 and the like in a plurality of stages, a detection signal of a threshold that is the maximum value Xm of the light amount values affected by the stray light is used. The BD corrected signal width Tw corresponding to the light amount setting value used in the image formation is calculated or acquired from the increase ratio $\alpha n$ of a signal width of a detection signal acquired in a region having a light amount value smaller than the light amount value Xm affected by the stray light. The signal width tn detected by the signal-width detecting section 113 and the BD corrected signal width Tw are compared. When the detected signal width tn of the detection signal is equal to or larger than the BD corrected signal width (equal to or larger than Tw), the synchronization signal is generated on the basis of a center position of the corrected signal width Tw. When the detected signal width tn of the detection signal is smaller than the BD corrected signal width Tw, the synchronization signal only has to be generated on the basis of a center position of the signal width to of the detection signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-029098, filed Feb. 17, 2015, which is hereby incorporated by reference herein in its entirety.

What is claimed is:

1. A scanning optical device comprising:
a laser light source that emits a laser light beam;
a laser control section that controls a light amount of the laser light beam emitted from the laser light source;
a photodetector that converts the laser light beam into an electric signal;
a signal-width detecting section that detects a signal width using an output waveform of the photodetector as a detection signal on the basis of a threshold; and
a control section that cause the signal-width detecting section to detect a first signal width when the laser light source emit laser light beams at a first light amount and a second signal width when the laser light source emit laser light beams at a second light amount larger than the first light amount,
wherein when a value related to a change of a difference between the first signal width and the second signal width is equal to or larger than a given value and the light amount used in image formation is equal to or larger than the second light amount, the control section acquires a corrected signal width corresponding to the light amount used in image formation based on a signal width detected when the laser light beam at a light amount smaller than the second light amount is emitted.

2. The scanning optical device according to claim 1, wherein the control section generates a synchronization signal on the basis of a center position of the corrected signal width.

3. The scanning optical device according to claim 1, wherein the control section determines whether a value related to a change of a difference between the first signal width and the second signal width is equal to or larger than a given value or not at time other than image formation time, and acquires the corrected signal width at the image formation time.

4. The scanning optical device according to claim 1, wherein the control section causes a storing section to store the signal width detected by the signal-width detecting section.

5. The scanning optical device according to claim 1, wherein the detection signal is square.

6. The scanning optical device according to claim 1, wherein the control section:
compares the signal width detected by the signal-width detecting section and the corrected signal width when the light amount used in the image formation is equal to or larger than the second light amount;
generates a synchronization signal on the basis of the corrected signal width when the detected signal width of the detection signal is equal to or larger than the corrected signal width; and
generates a synchronization signal on the basis of the signal width of the detection signal when the detected signal width of the detection signal is smaller than the corrected signal width.

7. The scanning optical device according to claim 6, wherein the control section generates the synchronization signal on the basis of a center position of the corrected signal width, or generates the synchronization signal on the basis of a center position of the signal width of the detection signal.

8. The scanning optical device according to claim 1, wherein the laser light beam is made incident directly on the photodetector without passing through an optical component.

9. The scanning optical device according to claim 8, wherein, in the photodetector, wire bonding and a terminal are provided in a beam scanning region on one of an upstream side and a downstream side of the light receiving section in a scanning direction of the laser light beam.

10. A scanning optical device comprising:
a laser light source that emits a laser light beam;
a laser control section that controls a light amount of the laser light beam emitted from the laser light source;
a photodetector that converts the laser light beam into an electric signal;
a signal-width detecting section that detects a signal width using an output waveform of the photodetector as a detection signal on the basis of a first threshold; and
a control section that cause the signal-width detecting section to detect a first signal width when the laser light source emit laser light beams at a first light amount and a second signal width when the laser light source emit laser light beams at a second light amount larger than the first light amount,
wherein when a value related to a change of a difference between the first signal width and the second signal width is equal to or larger than a given value and the light amount used in image formation is equal to or larger than the second light amount, the control section causes the signal-width detecting section to detect a detection width of the detection signal on the basis of a second threshold larger than the first threshold.

11. The scanning optical device according to claim 10, wherein the control section generates a synchronization signal on the basis of a center position of the detected signal width.

12. The scanning optical device according to claim 10, wherein the control section determines whether a value related to a change of a difference between the first signal width and the second signal width is equal to or larger than a given value or not at time other than image formation time, and acquires the detected signal width at the image formation time.

13. The scanning optical device according to claim 10, wherein the control section causes a storing section to store the signal width detected by the signal-width detecting section.

14. The scanning optical device according to claim 10, wherein the detection signal is square.

15. The scanning optical device according to claim 10, wherein the control section:
corrects a fourth signal width which is detected when the light amount used in image formation is a third light amount larger than the second light amount to a corrected signal width by using a value related to a change of a signal width detected in a smaller amount than the third light amount;
compares the signal width detected by the signal-width detecting section and the corrected signal width;
generates a synchronization signal on the basis of the corrected signal width when the detected signal width of the detection signal is equal to or larger than the corrected signal width; and
generates a synchronization signal on the basis of the signal width of the detection signal when the detected signal width of the detection signal is smaller than the corrected signal width.

16. The scanning optical device according to claim 15, wherein the control section generates the synchronization signal on the basis of a center position of the corrected signal width, or generates the synchronization signal on the basis of a center position of the signal width of the detection signal.

17. An image forming apparatus comprising:
a scanning optical device including:
a laser light source that emits a laser light beam;
a laser control section that controls a light amount of the laser light beam emitted from the laser light source;
a photodetector that converts the laser light beam into an electric signal;
a signal-width detecting section that detects a signal width using an output waveform of the photodetector as a detection signal on the basis of a threshold; and
a control section that cause the signal-width detecting section to detect a first signal width when the laser light source emit laser light beams at a first light amount and a second signal width when the laser light source emit laser light beams at a second light amount larger than the first light amount,
wherein when a value related to a change of a difference between the first signal width and the second signal width is equal to or larger than a given value and the light amount used in image formation is equal to or larger than the second light amount, the control section acquires a corrected signal width corresponding to the light amount used in image formation based on a signal width detected when the laser light beam at a light amount smaller than the second light amount is emitted,
the scanning optical device scanning an image bearing member surface with the laser light beam to form a latent image;
wherein the image forming apparatus further comprises:
a developing section that deposits toner on the image bearing member and develops the latent image as a toner image;
a transfer section that transfers the developed toner image to a transfer material; and
a fixing section that fixes the transferred toner image.

18. An image forming apparatus comprising:
a scanning optical device including:
a laser light source that emits a laser light beam;
a laser control section that controls a light amount of the laser light beam emitted from the laser light source;
a photodetector that converts the laser light beam into an electric signal;
a signal-width detecting section that detects a signal width using an output waveform of the photodetector as a detection signal on the basis of a first threshold; and
a control section that cause the signal-width detecting section to detect a first signal width when the laser light source emit laser light beams at first light amount and a second signal width when the laser light source emit laser light beams at a second light amount larger than the first light amount,
wherein when a value related to a change of a difference between the first signal width and the second signal width is equal to or larger than a given value and the light amount used in image formation is equal to or larger than the second light amount the control section causes the signal-width detecting section to detect a detection width of the detection signal on the basis of a second threshold larger than the first threshold, the scanning optical device scanning an image bearing member surface with the laser light beam to form a latent image;

wherein the image forming apparatus further comprises:

a developing section that deposits toner on the image bearing member and develops the latent image as a toner image;

a transfer section that transfers the developed toner image to a transfer material; and a fixing section that fixes the transferred toner image.

* * * * *